United States Patent [19]
De Vincent et al.

[11] 3,858,915
[45] Jan. 7, 1975

[54] SNAP TOGETHER COUPLING WITH INTEGRAL SPRING

[75] Inventors: Patsy De Vincent; Herbert D. Clark, both of Dayton, Ohio

[73] Assignee: General Motors Corporation, Detroit, Mich.

[22] Filed: Mar. 27, 1974

[21] Appl. No.: 455,048

[52] U.S. Cl. ............ 285/320, 285/81, 285/286, 285/349, 285/DIG. 25, 403/330
[51] Int. Cl. ............................................. F16l 37/10
[58] Field of Search ............ 285/320, 81, 309, 311, 285/312, 317, 349, DIG. 25, 153, 310, 14, 285/286; 403/322, 330

[56] References Cited
UNITED STATES PATENTS
| | | | |
|---|---|---|---|
| 685,851 | 11/1901 | Kifer et al. | 285/311 |
| 2,051,899 | 8/1936 | Rose | 285/320 X |
| 3,425,717 | 2/1969 | Bruce | 285/DIG. 25 |

*Primary Examiner*—Jordan Franklin
*Assistant Examiner*—Moshe I. Cohen
*Attorney, Agent, or Firm*—Arthur Krein

[57] ABSTRACT

A quick connect, snap together coupling for conduits, used to carry a fluid under pressure, embodies a socket and a plug which is insertable into the socket and which is in sealing relation with the socket when fully inserted therein, the plug pivotably carrying a loop spring wire integral therewith which is movable from a position out of engagement with the socket to a position in engagement with the socket to bias the plug fully into the socket in sealing relation therewith and to a bleed-down position in engagement with the socket to allow the plug to move axially outward relative to a portion of the socket to an unsealed position to bleed the conduits of pressurized fluid after which the plug can be completely released from the socket.

4 Claims, 5 Drawing Figures

PATENTED JAN 7 1975
3,858,915
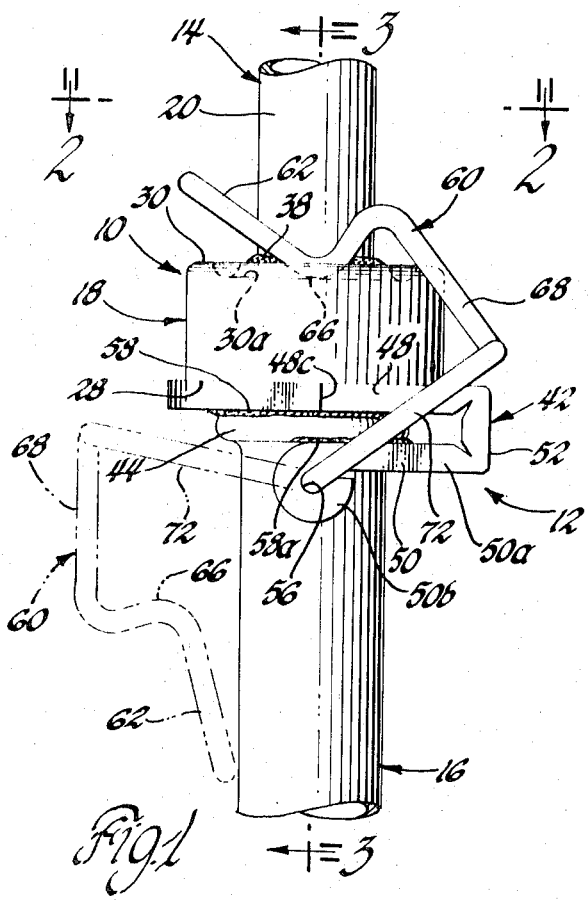
Fig.1
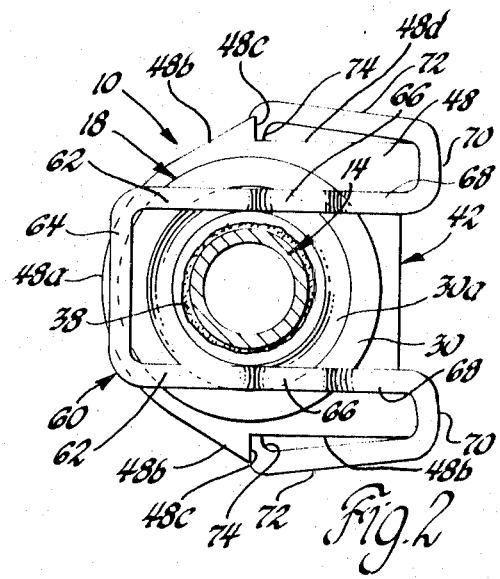
Fig.2
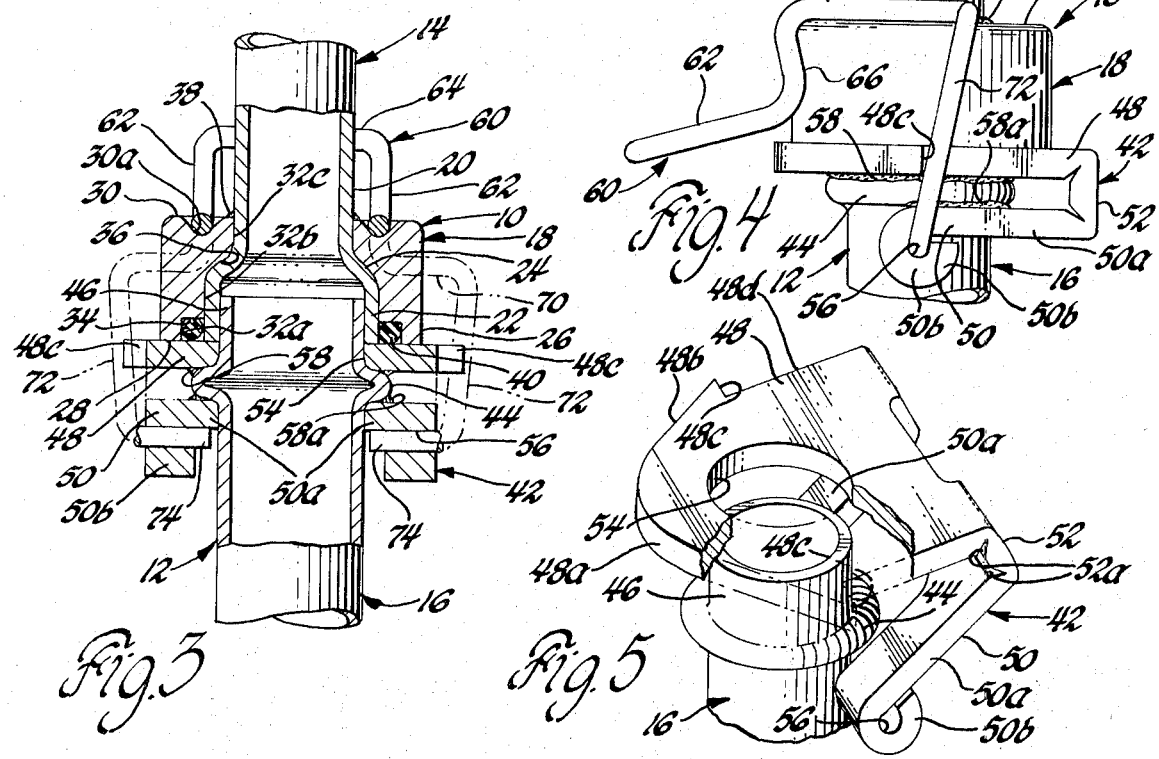
Fig.3
Fig.4
Fig.5

SNAP TOGETHER COUPLING WITH INTEGRAL SPRING

This invention relates to a conduit coupling and, in particular, to a quick connect snap coupling for conduits carrying fluid under pressure.

In various systems, conduits are connected together by suitable couplings, such as quick connect couplings, to carry a fluid under pressure from a source of a pressurized fluid, for example, the compressor in an air conditioner system. In such a system, even though the compressor may not be in operation, fluid under pressure may still be in the conduits when it is necessary to disconnect them from the source of pressurized fluid. To effect this disconnection of the conduits by means of a coupling, the coupling should preferably be constructed so that it can be partly disconnected so as to permit venting of fluid pressure from the conduits before the coupling is completely disconnected.

Accordingly, it is the primary object of this invention to provide an improved quick connect coupling for conduits which can be quickly connected together and which may be easily disconnected by pivotal movement of a loop spring connector, with partial disconnection being automatically first accomplished by movement of the loop spring connector in one direction to permit venting fluid pressure from the conduits before full disconnection can be made.

Another object of this invention is to provide an improved quick connect coupling that can be economically fabricated with a portion thereof readily fabricated by the use of a sheet metal stamping.

A further object of this invention is to provide a coupling for conduits which may be readily disconnected with the use of a simple tool and which has an intermediate disconnect position in which the pressure may leak off from the conduits but the coupling will not be forcibly disconnected by the pressure contained in the conduit system.

A still further object of this invention is to provide a simple and reliable snap coupling for connecting together tubular conduits.

These and other objects of the invention are obtained by means of a quick connect coupling for fluid conduits including a socket member and a plug member which is inserted into the socket member, the plug member consisting of a tube having an upset annular bead thereon with a clamp folded about the tube in abutment on opposite sides of the annular bead and fixed thereto, the clamp pivotally carrying a loop spring or connector which is adapted to cam over a grooved flange on the socket member to fix the axial position of the plug member relative to the socket member with an O-ring seal suitably positioned for sealing engagement therebetween, the loop spring also being movable to engage the flange with a second segment thereof to permit limited disengagement of the plug member relative to the socket member for bleed-down of fluid pressure in the conduits.

for a better understanding of the invention, as well as other objects and further features thereof, reference is had to the following detailed description of the invention to be read in connection with the accompanying drawings, wherein:

FIG. 1 is a view of the quick connect coupling of the subject invention shown in its fully coupled condition;

FIG. 2 is a view taken along line 2—2 of FIG. 1;

FIG. 3 is a sectional view of the coupling taken along line 3—3 of FIG. 1;

FIG. 4 is a view similar to FIG. 1, but illustrating the coupling in a partly released condition; and, FIG. 5 is a perspective view of a portion of the plug member of the coupling illustrating a step in the assembly of the fold-over clamp to the beaded tube of this plug member.

Referring to the drawings, the coupling of the invention comprises an annular, outer, female, tubular member or socket, generally designated 10, and a male, tubular member or plug, generally designated 12. The plug 12 is reciprocably received in the socket 10 to couple two tubular conduits 14 and 16 together. The conduit 14 may be a separate element suitably attached to the socket 10 or it may be formed, as shown, as an integral part of the socket.

In the preferred embodiment of the coupling illustrated, as best seen in FIG. 3, the socket 10, which is a tubular, female member, includes the conduit 14 and a socket housing 18 having a stepped bore therethrough. The conduit 14, which is preferably a thin walled tube of suitable ductile material, has at least adjacent one end or coupling end thereof a straight tube portion 20 terminating in an outwardly enlarged end or socket portion 22 of a diameter substantially greater than the nominal outside diameter of tube portion 20, with an inclined lock portion 24 therebetween.

The body of socket housing 18 may take any suitable external configuration but, preferably, it is round and constituted as a body of revolution about an axis with an annular outer surface 26 and opposed ends 28 and 30, the latter end 30, in effect, as this housing is assembled to conduit 14, providing a radial, external flange or shoulder surface with an annular groove 30a therein, for a purpose to be described. Housing 18 is provided with the stepped bore which includes bores 32a and 32c of different diameters extending from opposite ends 28 and 30, respectively, meeting coaxial with an intermediate bore 32b with a radial shoulder 34 between bores 32a and 32b and an inclined shoulder 36 between bores 32b and 32c. Bore 32c is of a diameter to slidably receive the straight tube portion 20 of conduit 14 while the bore 32b is of a diameter and the inclined shoulder 36 is of a size and configuration to receive and retain the socket portion 22 and inclined lock portion 24, respectively, of conduit 14. The socket portion 22 and inclined lock portion 24 of conduit 14 can be formed prior to the insertion of conduit 14 into socket housing 18 or they can be formed, in a known manner, after insertion of the conduit 14 into the socket housing 18. To provide a leak-proof joint between conduit 14 and socket housing 18, these elements are suitably bonded together as, for example, by a continuous brazed joint 38 between the outer peripheral surface of tube portion 18 and the inner radial surface of edge 30 of socket housing 18.

In its assembled position, the free end of socket portion 22 of the conduit 14 should lie in the plane of the surface of edge 28 or be slightly recessed into the socket housing 18, for a purpose which will become apparent. The inside diameter of socket portion 22 of conduit 14 is of a size to reciprocally receive the pilot tube or plug portion, to be described, of plug 12. Bore 32a is of a diameter substantially greater than the outside diameter of the socket portion 22 of conduit 14, as determined by the required inside diameter of this socket portion described above, and the bore 32a is of a depth whereby to provide an axial shoulder radially spaced from the socket portion 22 which, with the radial shoulder 34, forms an annular groove of a size to accommodate a suitable seal, such as O-ring 40, for sealing engagement relative to these surfaces and a surface, to be described, of the plug 12.

Plug 12, as best seen in FIG. 3, consists of the conduit 16 and a clamp 42 with a spring or connector, generally designated 60, pivotally secured to the clamp for engagement with the socket 10, in a manner to be described. Conduit 16, which is preferably a thin walled tube of suitable ductile material, is provided closely adjacent one end thereof with an annular bead 44 which may be upset, as shown, or otherwise provided on the conduit to extend radially outward from the nominal outside diameter of this conduit, the bead 44 being spaced a predetermined distance from the end of the conduit to provide a pilot tube or plug portion 46 of a suitable outside diameter for entry into the socket portion 22 of socket 10.

clamp 42, made of a suitable material and fabricated, for example, as a stamping, is in the preferred embodiment a fold-over clamp which is substantially U-shaped in its assembled configuration as secured to the conduit 16 in abutting engagement with opposite sides of the bead 44 and includes a first leg 48 and a second leg 50 connected by an integral bight or connecting leg 52. As best seen in FIG. 5, the leg 48 is provided with a round aperture 54 of a diameter to slidably receive the plug portion 46 of conduit 16 and the leg 50 is bifurcated to provide a pair of parallel, spaced apart legs 50a extending from the main body portion of this leg, the legs 50a being spaced apart a sufficient distance to slidably receive conduit 16 therebetween. The free ends of each of these leg portions 50a terminate in a return bent or looped spring retention portion 50b to provide an aperture 56 for pivotally supporting a pivot segment of spring 60.

Again referring to FIG. 5, the clamp 42, in its configuration as originally fabricated, is not U-shaped with the leg 50 being originally formed in an open position relative to the leg 48 whereby the leg 50 can first be assembled to the plug portion of conduit 16 as by passing this plug portion through the aperture 54 in the leg 48, the leg 48 then being moved axially on the plug portion 46 until it abuts against the free end tube side of the bead 44 after which the leg 50 is folded back over the conduit 16 into the U-shape configuration, as seen in FIGS. 1 and 4, with the bead 44 thus securely sandwiched between the legs 48 and 50 of clamp 42. To facilitate bending of clamp 42 during assembly, suitable score lines 52a can be provided on opposite edges of bight 52. The clamp 42 is then further bonded to the conduit 16 as by a continuous annular brazed joint 58 and brazed joint 58a joining the bead 44 to the legs 48 and 50, respectively, the brazed joint 58 further providing a leak-proof joint between the conduit 16 and clamp 42. Clamp 42 and, in particular, leg 48 thereof, as assembled to conduit 16, provides an annular, radial flange or shoulder extending from conduit 16 with the outboard surface of this flange or shoulder providing a suitable seal seat for O-ring 40.

Spring or connector 60 made, for example, of spring wire is in the form of a loop open at one end and is sinuously bent to provide a pair of spaced apart segments 62 connected together at one end by a cross segment 64 and each connected at its other end to a bent cam or primary lock segment 66. The opposite end of each cam segment 66 is each connected to one end of a substantially straight secondary lock segment 68, the opposite end of each lock segment 68 being connected to an outward turned bight segment 70 which, in turn, is connected to a pivot lever segment 72 that is connected to an inturned pivot segment 74, each of the latter being pivotally supported in an aperture 56 provided by one of the looped portions 50b of clamp 42 whereby spring 60 is pivotally carried by the plug 12. The length of each pivot segment 74, which are inturned relative to each other, is such as to provide a normal gap at this open end of the spring of a size appropriate for the outside diameter of the conduit 16 being used.

In the embodiment illustrated, as best seen in FIG. 2, the axis of each of a common series of integral segments 62, 66 and 68 may lie in common planes with the two series of these segments being normally spaced apart in parallel relationship relative to each other to provide adequate clearance between these segments of the spring 60 with respect to the outer peripheral surface of conduit 14 to permit free movement of these segments relative to the conduit 14 of socket 10.

Assuming that the plug 12 is engaged in socket 10, in a position approximate to the position of these elements, shown in FIG. 1, the spring 60 is pivotally movable from an unlocked position, shown by broken lines in FIG. 1, relative to socket 10 to a full or primary lock position relative to socket 10, as shown in solid line in this figure.

In the full or primary lock position of the spring 60 relative to socket 10, the cam segments 66 of the spring are engaged in the annular groove 30a provided in the surface 30 of socket housing 18 and are releasably locked relative thereto because of the over-center relationship of the cam segments 66 relative to the pivotal axis of the spring. Thus, spring 60, with its cam segments 66 thereon, can be considered as an over-center connector clamp means. With spring 60 positioned in the primary lock position shown in FIG. 1, the socket 10 and plug 12 are biased axially toward each other to a full seal position in which the O-ring 40 is compressed into sealing engagement with the planar outboard surface of leg 48 of clamp 42 and against the walls defining the O-ring retaining groove in socket 10, whereby the socket 10 and plug 12 are interconnected in full sealing engagement relataive to each other permitting the flow of a high pressure fluid by the conduits 14 and 16.

If assuming that the spring 60 is in the primary lock position, as shown in FIG. 1, and it is then desired to disconnect the plug 12 from the socket 10, it will first be necessary to rotate the spring in a counterclockwise direction, with reference to FIG. 1, to move the cam segments 66 out of over-center relationship to the pivotal axis of the spring thereby permitting the spring 60 to move to a secondary lock position, the position shown in FIG. 4, established by engagement of the pivot lever segments 72 of the spring with in-line, radially, oppositely extending, stop shoulders 48c provided for this purpose on the sides of leg 48 of clamp 42. In this secondary lock position, the secondary lock segments 68 of the spring overlie the radial flange surface 30 of socket housing 18 to permit limited axial separation of the plug 12 relative to socket 10 while holding these elements relative to full axial separation. With the spring 60 in the secondary lock position, as shown in FIG. 4, the socket 10 and plug 12 are permitted to move axially apart from the full seal position shown in FIG. 1 to a bleed-down position in which the O-ring 40 is no longer compressed into sealing engagement with the outboard surface of leg 48 of the clamp 42 and plug 12, thus permitting bleed-down of any high pressure fluid that may be in the conduits 14 and 16.

As can best be seen with reference to FIG. 2, the leg 48 of clamp 42 is provided at its free end with a semicircular end portion 48a merging on opposite sides thereof with curved side portions 48b which provide an on-cam rise for each stop shoulder 48c. Each stop shoulder 48c interconnects a curved side portion 48b to one of the straight side portions 48d of the leg 48. As seen in FIG. 2, the side portions 48d, which are parallel to each other, are of a width less than the nominal width between pivot lever segments 72 of spring 60 whereas the maximum radial extent of stop shoulders 48c is greater than the nominal width between pivot lever segments 72 of the spring 60, whereby these shoulders 48c act as a stop for the pivot lever segments 72 of spring 60 thereby preventing free pivotal movement of spring 60 from the primary lock position toward the unlocked position.

After bleed-down of the pressure, if any, of fluid in conduits 14 and 16, an operator can then use a suitable tool, such as a screw driver, to effect spreading of the pivot lever segments 72 of the spring 60 past the stop shoulders 48c to permit continued pivotal movement of the spring from the secondary lock position to the unlocked position, previously described. This can be readily accomplished because the spring 60 is an open loop spring. With the spring 60 then in the unlocked position, shown by broken lines in FIG. 1, the plug 12 can then be axially separated from the socket 10.

It will be readily seen, with reference to FIG. 2, that when the spring 60 is pivoted from the unlocked position toward the primary lock position, the pivot lever segments 72 and secondary lock segments 68 will be cammed apart by engagement with curved side portions 48b of leg 48 and the periphery of socket housing 18 to permit forced pivotal movement of the spring toward the primary lock position.

While the invention has been described with reference to a preferred embodiment disclosed herein, it will be apparent that many modifications can be made to the quick connect coupling structure shown by those skilled in the coupling art. For example, although the socket portion 22 is shown as an enlarged tube section at one end of conduit 14, which has a nominal diameter less than that of the socket portion, it will be apparent that the conduit 14 could be of a suitable diameter so that the socket portion could be provided by a straight section of such a conduit, it then only being necessary that the conduit 14 be rigidly fixed, in a known manner, to the socket housing 18 to prevent axial separation of these elements to prevent fluid discharge therebetween. It will also be apparent that, if desired, the socket portion 22 of conduit 14 could be eliminated as such with a suitable socket portion then being formed directly in the socket housing 18 to directly receive the plug portion 46 of plug 12. It will also be apparent to one skilled in the applicable art that the seal arrangement could be modified from that shown as, for example, by having the O-ring 40 encircling the plug portion 46 in sealing engagement therewith with a suitable seal seat then being provided for this arrangement on the socket 10, it only being necessary that adequate provision be provided to support the O-ring in either the socket 10 or on the plug 12 so that the seal ring is retained by one of these elements upon uncoupling of the elements.

What is claimed is:

1. A fluid conduit coupling comprising, in combination, an outer tubular member defining a socket, a tubular plug member slidably received in said socket and being in sealing relation to said socket when fully inserted therein, said socket having a first seal seat for an annular seal ring at the plug receiving end thereof and an external radial flange provided with a planar surface containing an annular groove therein facing in the opposite direction from said first seal seat, said plug member having an external radial flange portion positioned to provide a second seal seat facing said socket, an annular seal positioned for sealing engagement relative to said first seal seat and to said second seal seat and, a loop spring having primary spaced apart lock segment means and spaced apart secondary lock segment means rotatably secured to said plug member for pivotal movement about an axis relative to said plug member between a first position wherein both said lock segment means are out of engagement with said socket to a second position wherein said primary lock segment means are engaged in said annular groove of said radial flange in an over-center position relative to said axis whereby said annular seal is compressed in sealing engagement with said first seal seat and with said second seal seat, and an intermediate position between said first position and said second position in which said secondary lock segment means engage said planar surface containing said groove permitting limited axial separation of said tubular plug member relative to said socket.

2. A fluid conduit coupling according to claim 1 wherein said plug member includes a tube having an annular upset bead adjacent one end thereof with a plug portion extending therefrom for insertion into said socket and a fold-over clamp having a first leg and a second leg connected at one end by an integral bight, said first leg having an aperture therein encircling said plug portion and being fixed in sealed abutment against one side of said upset bead, said first leg providing said second seal seat, said second leg being bifurcated to partly encircle said tube in abutment against the opposite side of said upset bead and having looped portions on the free end thereof pivotally supporting said loop spring.

3. A fluid conduit coupling comprising, in combination, a male member having a radial extending flange at one end thereof with a tubular plug extending therefrom, a complementary tubular female member with a socket receiving said tubular plug, said female member having opposed first and second end surfaces with said socket extending from said first end and having an annular seal seat encircling said socket, said second end having a planar surface containing an annular groove therein, a compressible O-ring seal positioned for sealing engagement with said radial extending flange and with said seal seat of said first end of said female member, a loop spring pivotally secured to said male member and rotatable about an axis thereof, said loop spring having spaced apart primary lock segment means and spaced apart secondary lock segment means, said loop spring being pivotally rotatable about said axis between a first position wherein both said lock segment means are out of engagement with said socket to a second position wherein said primary lock segments are engaged in said annular groove of said radial flange in an over-center position relative to said axis whereby said annular seal is compressed in sealing engagement with said first seal seat and with said second seal seat, and an intermediate position between said first position and said second position in which said secondary lock segment means are in engagement with said planar surface containing said groove permitting limited axial separation of said tubular plug member relative to said socket.

4. A fluid conduit coupling according to claim 3 wherein said male member includes a tube having an annular bead on the exterior thereof and spaced from one end thereof and said tubular plug extending therefrom and a fold-over clamp fixed to said tube on opposite sides of said bead in abutment thereagainst, said fold-over clamp having an apertured leg encircling said tubular plug to form said radial extending flange, a bifurcated leg terminating in a looped portion to pivotally support said loop spring and an integral connecting bight.

* * * * *